United States Patent
Balasubramanian (10) Patent No.: US 10,338,665 B2
(45) Date of Patent: Jul. 2, 2019

(54) MICROCONTROLLER POWER REDUCTION SYSTEM AND METHOD

(71) Applicant: Infineon Technologies AG, Neubiberg (DE)

(72) Inventor: Prakash Kalanjeri Balasubramanian, Bangalore (IN)

(73) Assignee: Infineon Technologies AG, Neubiberg (DE)

( * ) Notice: Subject to any disclaimer, the term of this patent is extended or adjusted under 35 U.S.C. 154(b) by 79 days.

(21) Appl. No.: 15/191,084

(22) Filed: Jun. 23, 2016

(65) Prior Publication Data

US 2017/0371396 A1  Dec. 28, 2017

(51) Int. Cl.
| | |
|---|---|
| *G06F 1/32* | (2019.01) |
| *G06F 1/3234* | (2019.01) |
| *G06F 1/3296* | (2019.01) |
| *G06F 1/3206* | (2019.01) |

(52) U.S. Cl.
CPC ............ *G06F 1/3243* (2013.01); *G06F 1/325* (2013.01); *G06F 1/3206* (2013.01); *G06F 1/3296* (2013.01); *Y02D 10/152* (2018.01); *Y02D 10/172* (2018.01)

(58) Field of Classification Search
CPC ....................................................... G06F 1/32
See application file for complete search history.

(56) References Cited

U.S. PATENT DOCUMENTS

| | | | |
|---|---|---|---|
| 6,715,095 B1 * | 3/2004 | Larsen ...................... | G06F 1/12 713/324 |
| 2002/0083354 A1 * | 6/2002 | Adachi ................... | G06F 1/206 713/322 |
| 2006/0195714 A1 * | 8/2006 | Hanaki ..................... | G06F 1/08 713/500 |
| 2011/0026432 A1 * | 2/2011 | Gruber .................. | H04L 12/417 370/254 |
| 2013/0173951 A1 * | 7/2013 | Vogel ........................ | G06F 1/10 713/600 |
| 2016/0179177 A1 * | 6/2016 | Henry ................. | G06F 9/30076 713/320 |

OTHER PUBLICATIONS

"Flip-Flop" published on WikiPedia on Jun. 5, 2015.*

* cited by examiner

*Primary Examiner* — Kim Huynh
*Assistant Examiner* — Kevin M Stewart
(74) *Attorney, Agent, or Firm* — Schiff Hardin LLP (57) ABSTRACT

A microcontroller that can be configured to selectively operate in a synchronous mode or an asynchronous mode, and a method of selectively switching the operating mode is described. The microcontroller can include a processor and a system controller. The processor can be configured to operate synchronously in a synchronous operating mode and asynchronously in an asynchronous operating mode. The processor can also be configured to generate a processor idle status signal indicative of the processor operating in a reduced power mode, and generate a programming signal. The system controller can be configured to generate an asynchronous mode signal based on the programming signal and the processor idle status signal, and provide the asynchronous mode signal to the processor to control the processor to selectively operate in the synchronous operating mode and in the asynchronous operating mode.

23 Claims, 8 Drawing Sheets

MICROCONTROLLER POWER REDUCTION SYSTEM AND METHOD

BACKGROUND

Field

Embodiments described herein generally relate to microcontroller, including reducing power consumption of the microcontroller by controlling the microcontroller to selectively operate in synchronous or asynchronous operating mode.

Related Art

System on chips (SOCs) can include a processor or multi-processor configurations having two or more central processing units (CPUs). To reduce power consumption, processors can operate in a reduced power mode. SOCs can utilize dynamic voltage and frequency scaling (DVFS) to reduce power consumption. However, the power savings resulting from DVFS are impacted by the declining operating voltages of modern SOCs. For example, DVFS loses its efficacy at lower technology nodes, such as 65 nm, 40 nm, etc.

BRIEF DESCRIPTION OF THE DRAWINGS/FIGURES

The accompanying drawings, which are incorporated herein and form a part of the specification, illustrate the embodiments of the present disclosure and, together with the description, further serve to explain the principles of the embodiments and to enable a person skilled in the pertinent art to make and use the embodiments.

The exemplary embodiments of the present disclosure will be described with reference to the accompanying drawings. The drawing in which an element first appears is typically indicated by the leftmost digit(s) in the corresponding reference number.

DETAILED DESCRIPTION

In the following description, numerous specific details are set forth in order to provide a thorough understanding of the embodiments of the present disclosure. However, it will be apparent to those skilled in the art that the embodiments, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring embodiments of the disclosure.

As an overview, electrical systems, including system on chips (SOCs), can operate in active and reduced-power (e.g., sleep) modes. During a reduced-power mode, the system will consume power, including static leakage. During an active operating mode, the system will consume power, including switching power. As described in the present disclosure, the power consumption resulting from switching power can be reduced, thereby reducing the overall power consumption of the SOCs of the exemplary embodiments.

Figure 1A:
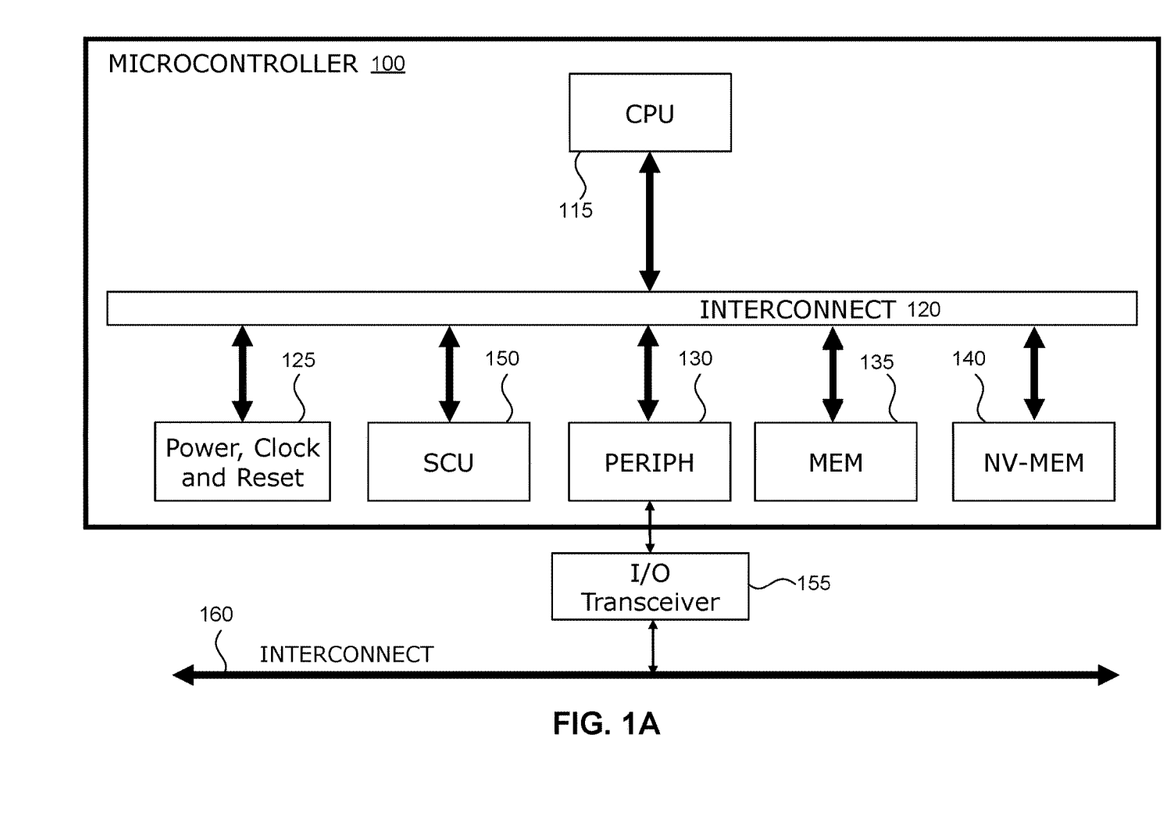
FIG. 1A illustrates a microcontroller according to an exemplary embodiment of the present disclosure.

FIG. 1A illustrates a microcontroller 100 according to an exemplary embodiment of the present disclosure. In an exemplary embodiment, the microcontroller 100 can be configured to connect to an interconnect 160 (e.g., bus) via an Input/Output (I/O) transceiver 155. The interconnect 160 facilitates communication between various external components also connected to the interconnect 160.

In an exemplary embodiment, the microcontroller 100 can include can one or more processors, such as central processing units (CPUs) 115. The CPU 115 can include one or more applications, where the applications are configured to run on the corresponding CPU 115. The applications can include a computer program having one or more instructions that, when executed by the corresponding CPU 115, controls the CPU 115 to perform one or more functions defined by the application. In an exemplary embodiment, the microcontroller 100 includes processor circuitry configured to perform one or more functions and/or operations of the microcontroller 100.

The microcontroller 100 also can include a power, clock and reset device 125, one or more peripheral devices 130, one or more volatile memories 135, one or more non-volatile memories 140, and a system controller 150. The system controller 150 can also be referred to as a system control unit (SCU). The CPU 115 is connected to the power, clock and reset device 125, the peripheral device(s) 130, the memory 135, the non-volatile memory 140, and the system controller 150 via interconnect 120 (e.g., bus). The interconnect 120 facilities communication between the various components connected to the bus 120. In operation, components connected to the interconnect 120 can function as a bus master or as a bus slave. For example, a bus master (e.g., CPU 115) can initiate communication with a bus slave (e.g., peripheral 130) over the interconnect 120 and the chosen bus slave provides a response to the bus master via the interconnect 120.

The memory 135 can be any well-known volatile memory that stores data and/or instructions. The memory 140 can be any well-known non-volatile memory that stores data and/or instructions. The memory 135 and/or 140 can be non-removable or removable.

The peripheral device(s) 130 can be any peripheral device as would be understood by one of ordinary skill in the relevant arts, such as, for example, a display, an input/output (I/O) device (e.g., keyboard, mouse, speaker, light source, etc.), or a communication/network interface or transceiver.

The power, clock and reset 125 can be configured to generate one or more clock signals having corresponding frequencies and/or one or more reset signals. Alternatively or additionally, the power, clock and reset 125 can be configured to manage and/or distribute power. For example, the power, clock and reset 125 can distribute power to one or more components of the microcontroller 100. Power can be supplied to the power, clock and reset 125 from, for example, an external power source. The power, clock and reset 125 can include processor circuitry configured to perform the functions of the power, clock and reset 125, including the generation of the clock signals and/or reset signals.

The CPU 115 can include processor circuitry configured to control the overall operation of the microcontroller. In an exemplary embodiment, the CPU 115 can be configured to execute one or more instructions of an associated application running on the CPU 115 to perform one or functions of the application, and/or perform one or more functions based on one or more instructions stored in memory 135 and/or 140.

Figure 1B:
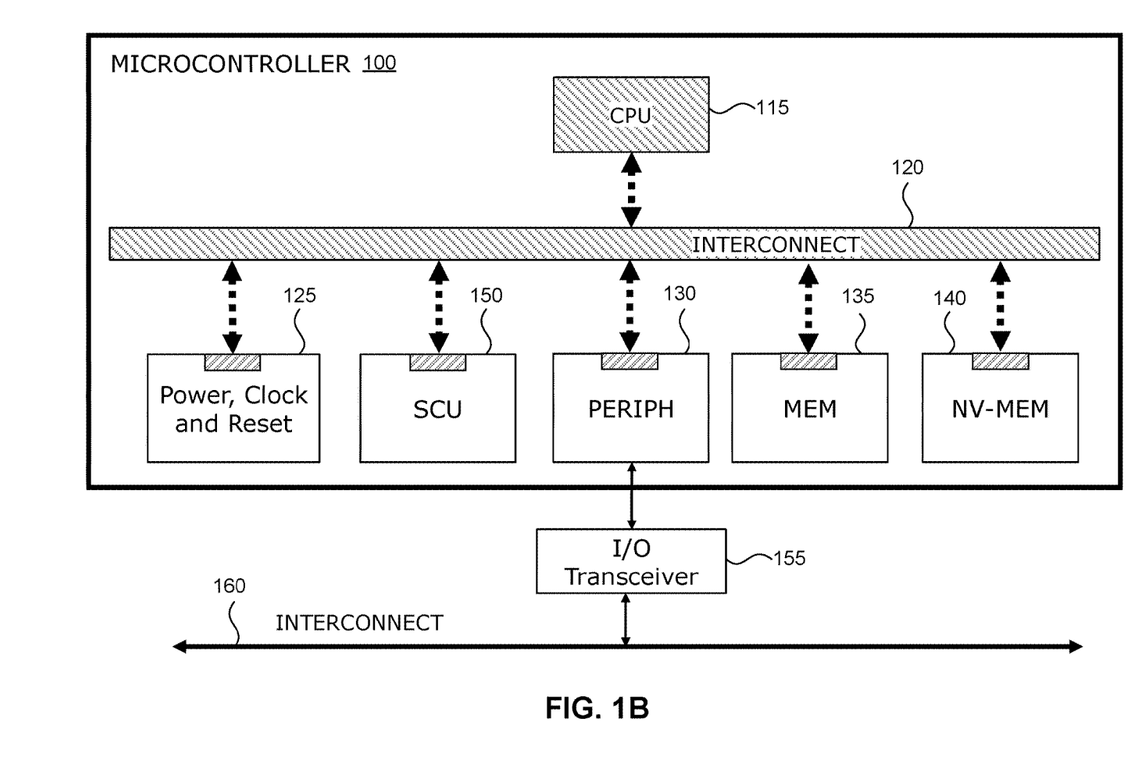
FIG. 1B illustrates a microcontroller according to an exemplary embodiment of the present disclosure.

In an exemplary embodiment, the microcontroller 100 can be configured to operate in a synchronous operating mode (FIG. 1A) or an asynchronous operating mode (FIG. 1B). By operating in the asynchronous operating mode, the microcontroller 100 can reduce the switching power consumed by the microcontroller 100. The asynchronous operating mode can also be referred to as an asynchronous overlay mode. The synchronous operating mode can also be referred to as the normal mode or the normal operating mode of the microcontroller 100.

During the synchronous operating mode, transmissions between the various components and/or between external components via the bus 160 are synchronized by a clock signal generated by a clock generator (e.g., power, clock and reset 125). The clock generator can be within the microcontroller 100 (e.g., power, clock and reset 125) or can be an externally-located clock that provides a clock signal to the microcontroller 100 and one or more components of the microcontroller 100. In these examples, the one or more of the components (e.g., CPU 115, interconnect 120, peripheral device 130, etc.) are connected to the clock generator and receive the clock signal generated by the clock generator.

During the asynchronous operating mode, one or more components of the microcontroller 100 are operating asynchronously. While operating asynchronously, the communications between the components of the microcontroller 100 are not governed by the clock generator. In operation, coordination between the components of the microcontroller 100 and/or with one or more external components can be achieved using, for example, packet arrival times, changes (transitions) of signals, handshake protocols, or one or more other methods as would be understood by one of ordinary skill in the relevant arts.

With reference to FIG. 1B, while operating in the asynchronous operating mode, one or more components of the microcontroller 100 can fully operate asynchronously (e.g., CPU 115, interconnect 120) and/or one or more components of the microcontroller 100 can partially operate asynchronously (e.g., memory 135, 140, peripheral device(s) 130, SCU 150, the and/or power, clock and reset device 125). In FIG. 1B, the crosshatching represents an asynchronous operation. In an exemplary embodiment, the CPU 115 and the interconnect 120 are configured to fully operate asynchronously during the asynchronous operating mode, which is represented by the crosshatching throughout the respective component. The SCU 150, memory 135, memory 140, peripheral device(s) 130, and/or power, clock and reset device 125 are configured to partially operate asynchronously during the asynchronous operating mode, which is represented by only a portion of each component being crosshatched. In an exemplary embodiment, the portion of the components operating asynchronously can include a corresponding bus interface that decodes and responds to messages received via the interconnect 120. In this example, the other portions of the components continue to operate synchronously based on the clock signal.

Further, the interconnections between the various components and the interconnect 120 are illustrated by dashed arrows, which represent that such connections are asynchronous. Conversely, as illustrated in FIG. 1A, the interconnections are solid to represent that the connections are operating synchronously.

Figure 2:
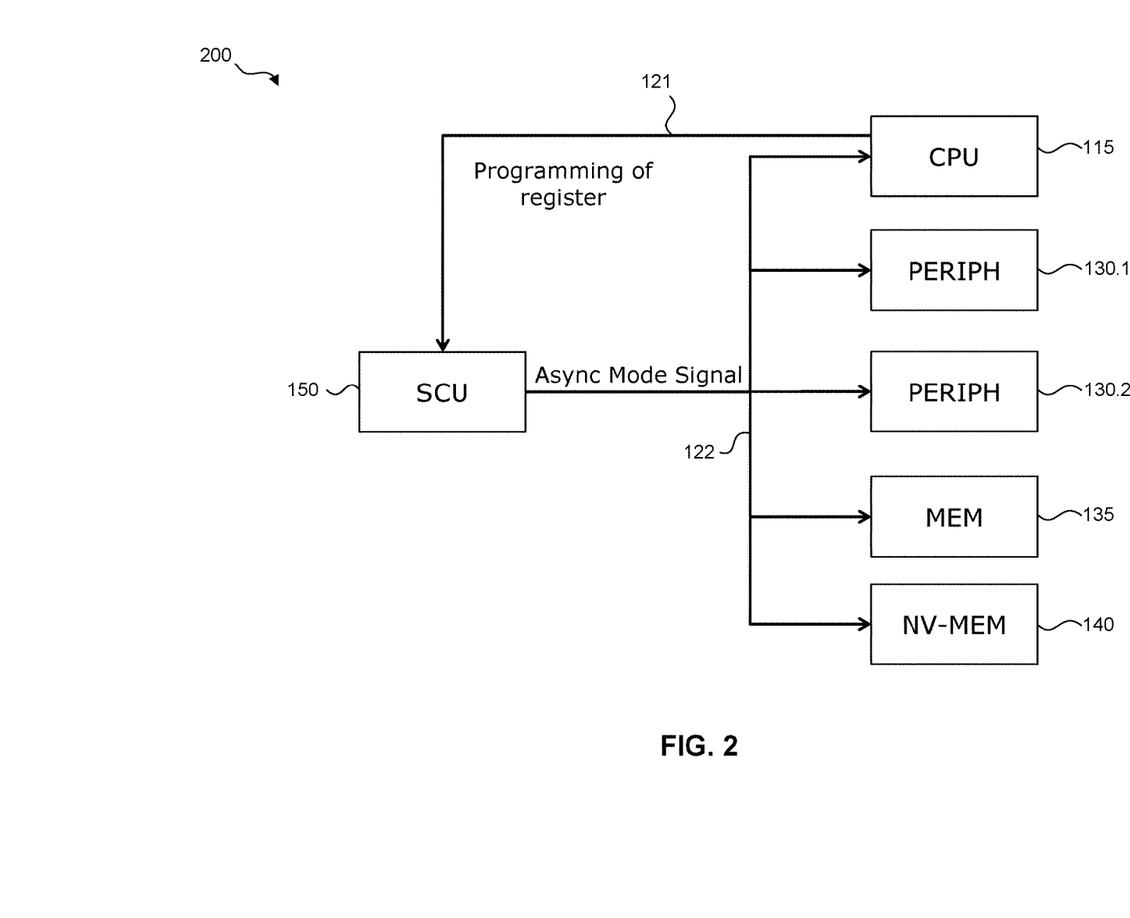
FIG. 2 illustrates an example operation of a microcontroller according to an exemplary embodiment of the present disclosure.

FIG. 2 illustrates an example operation 200 of the microcontroller 100 according to an exemplary embodiment of the present disclosure.

In an exemplary embodiment, the SCU 150 of the microcontroller 100 is configured to generate an asynchronous mode signal 122 to control one or more components of the microcontroller 100 to operate in the synchronous operating mode or the asynchronous operating mode.

In an exemplary embodiment, the SCU 150 can generate the asynchronous mode signal 122 based on a programming signal 121 provided by the CPU 115. In an exemplary embodiment, the programming signal 121 is a bus transaction. For example, the CPU 115 programs the SCU 150 based on one or more bus transactions. The CPU 115 can be configured to determine when the CPU 115 and/or one or more other components of microcontroller 100 are to operate in the asynchronous mode or the synchronous mode. In an exemplary embodiment, one or more applications running on the CPU 115 can be configured to determine which of the operating modes the microcontroller 100 (and one or more of the components therein) are to operate in. In this example, the asynchronous mode signal 122 can be used to selectively control one or more components of the microcontroller 100 to operate asynchronously or synchronously based on the mode specified by the asynchronous mode signal. In an exemplary embodiment, the SCU 150 includes one or more circuits and/or logic configured to perform the operations and/or functions of the SCU 150.

Figure 3A:
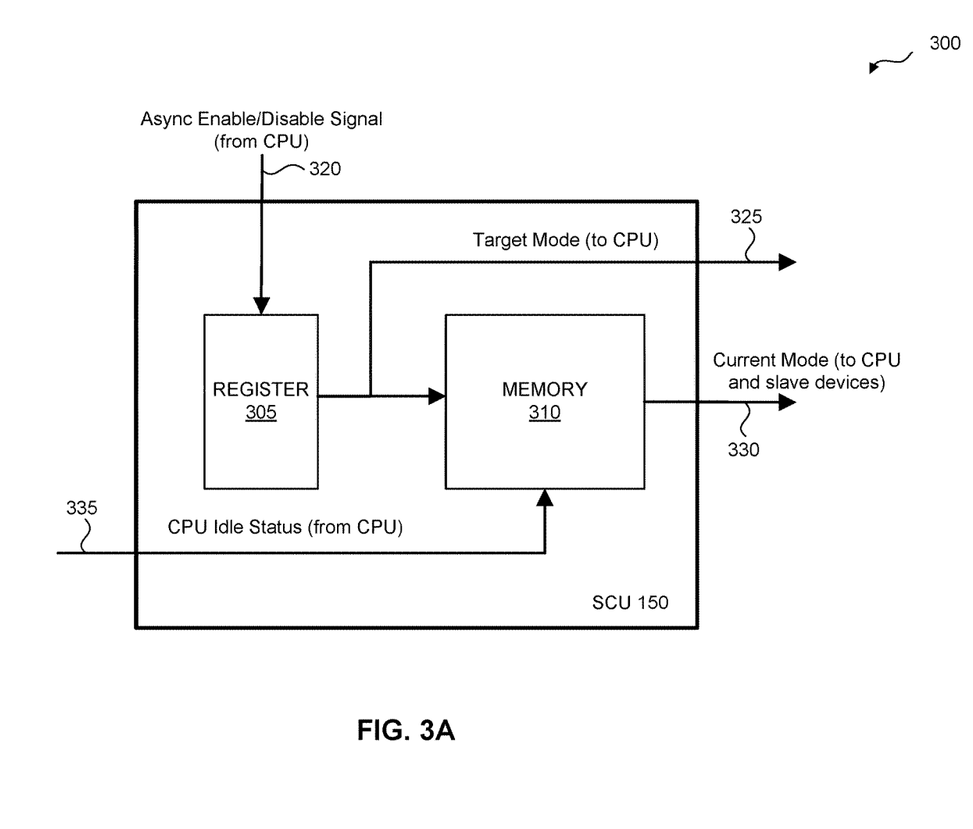
FIG. 3A illustrates a system controller according to an exemplary embodiment of the present disclosure.

FIG. 3A illustrates the SCU 150 according to an exemplary embodiment of the present disclosure. In an exemplary embodiment, the SCU 150 includes a register 305 and a memory 310. In an alternative embodiment, with reference to FIG. 3B, the SCU 150 can include the register 305 with the memory 310 being externally located outside of the SCU 150. In this example, the memory 310 can be located within another component of the microcontroller 100 or as a standalone component of the microcontroller 100.

Figure 3B:
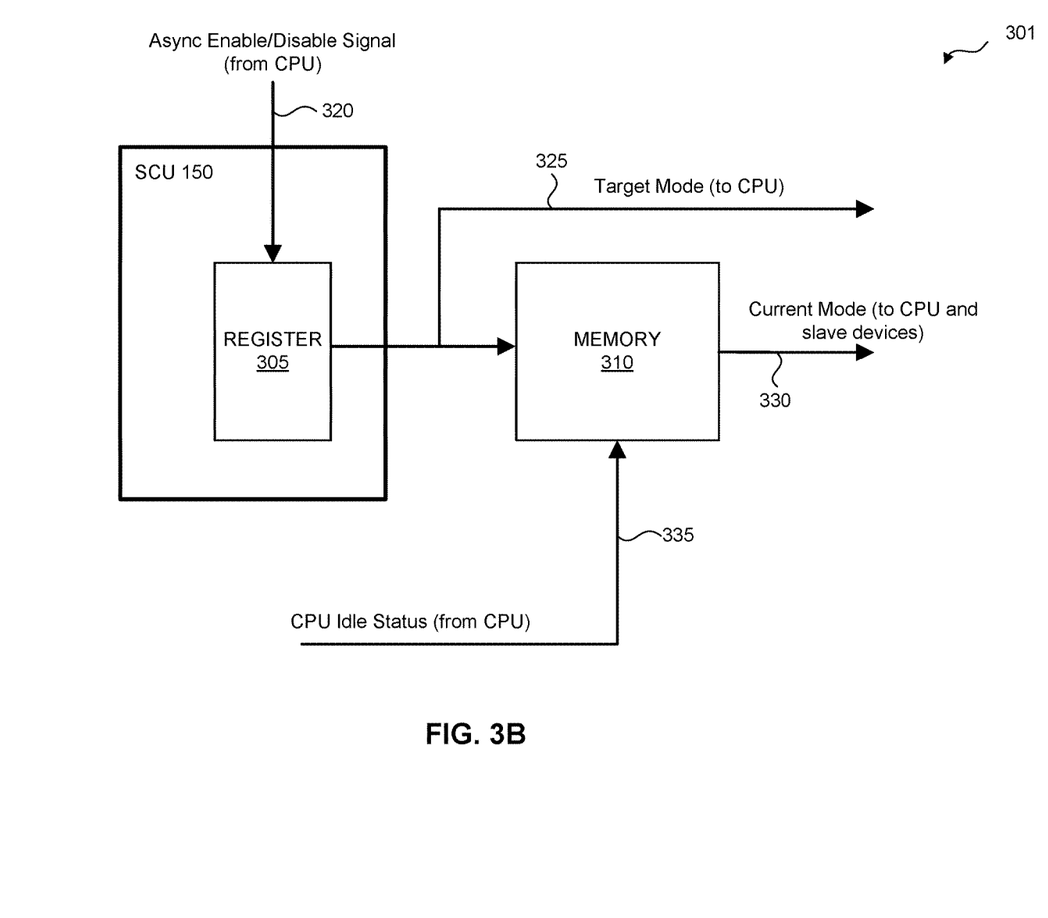
FIG. 3B illustrates a system controller according to an exemplary embodiment of the present disclosure.

With continued reference to FIGS. 3A and 3B, the register 305 can generate a target mode signal 325 and provide the target mode signal 325 to the CPU 115 (and/or one or more other components of the microcontroller 100) and the memory 310. In an exemplary embodiment, the register 305 is configured to generate the target mode signal 325 based on an asynchronous enable/disable signal 320 received from the CPU 115. In this example, the asynchronous enable/disable signal 320 can correspond to the programming signal 121 illustrated in FIG. 2. In an exemplary embodiment, the register 305 is a hardware register configured to process one or more bits of information, including storing one or more bits of information. The register 305 can include one or more circuits and/or logic. In an exemplary embodiment, the register 305 is a volatile memory.

In an exemplary embodiment, the memory 310 can be configured to generate a current mode signal 330 and provide the current mode signal to the CPU 115 and/or one or more other components of the microcontroller 100. In an exemplary embodiment, the memory 310 can be configured to generate the current mode signal 330 based on the target mode signal 325 provided by the register 305 and a CPU idle status signal 335 provided by the CPU 115. The CPU idle status signal 335 indicates the idle status of the CPU 115, including, for example, if the CPU 115 has entered (and/or intends to enter) a reduced power (e.g., sleep) state.

In an exemplary embodiment, the value of the current mode signal 330 is based on the target mode signal 325 and the output of the current mode signal 330 is controlled (e.g., enabled/disabled) based on the CPU idle status signal 335. For example, the value of the current mode signal 330 can correspond to the value of the target mode signal 325, while the output of the current mode signal 330 by the memory 310 depends on the value of the CPU idle status signal 335 received by the memory 310. For example, memory 310 can be configured to receive the target mode signal 325 and will output the value of the target mode signal 325 as the current mode signal 330 in response to the CPU idle mode signal 335 having a value that indicates that the CPU 115 has entered a reduced (e.g., sleep) state. The operation of the memory is described in more detail below with reference to FIG. 4.

In operation, the target mode signal 325 indicates the intended operating state of the microcontroller 100. The target mode signal 325 can be used by the CPU 115 to adjust one or more processes performed by the CPU 115 to transition to a reduced power (sleep) state. The processes can include, for example, allowing the instructions being executed and that are pending execution to complete, inserting no operation commands (NOP) into one or more pipeline latches, adjusting the program counter, and/or gate all datapath clocks. Further, the current mode signal 330 can be used to control the CPU 115 and/or one or more other components of the microcontroller 100 to enter the operating state previously indicated by the target mode signal 325.

Figure 4:
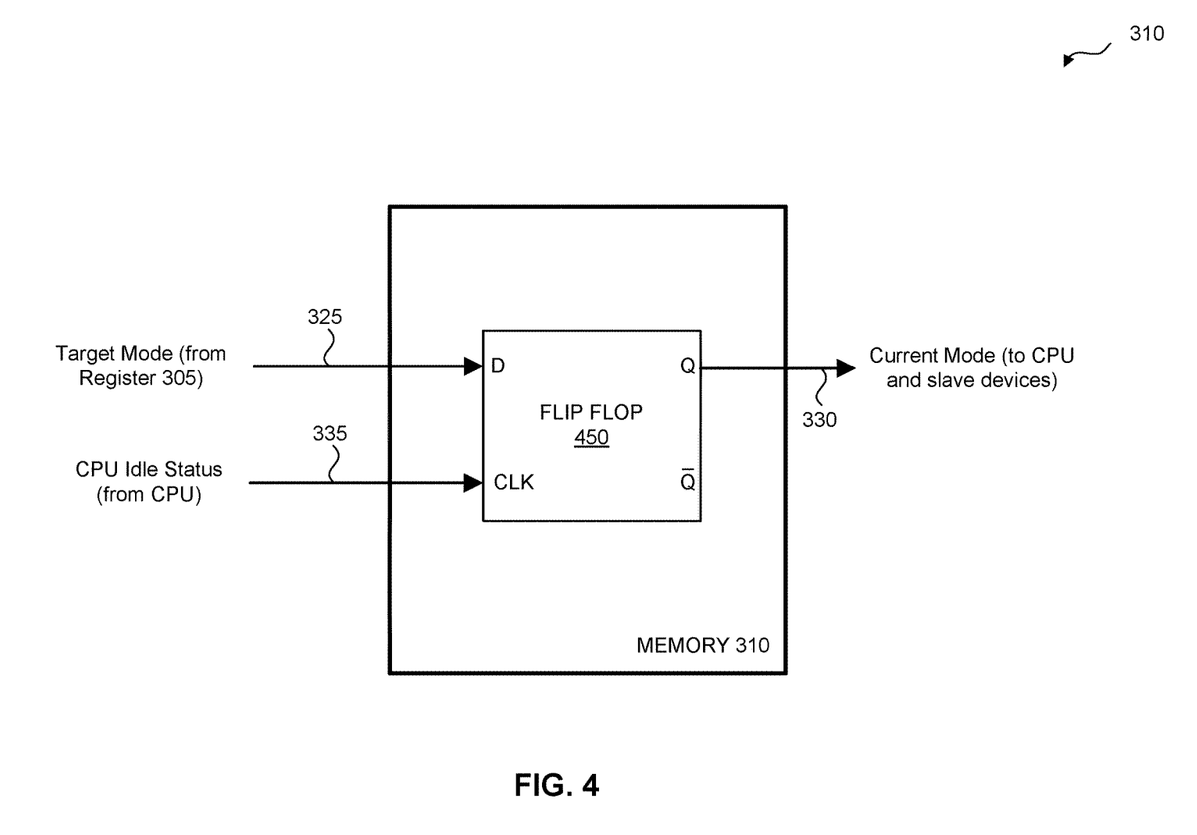
FIG. 4 illustrates a memory according to an exemplary embodiment of the present disclosure.

Turning to FIG. 4, the memory 310 can include a flip-flop 450 in an exemplary embodiment. The flip-flop 450 can be a D flip-flop, but is not limited thereto.

In an exemplary embodiment, memory 310 is configured such that the data input (D) of the flip-flop 450 receives the target mode signal 325 from the register 305. The clock input (CLK) of the flip-flop 450 receives the CPU idle status signal 335 from the CPU 115. In operation, the output (Q) of the flip-flop 450 will become active (i.e., pass the value at the input D to the output Q) based on the input supplied to the clock input (CLK). For example, the target mode signal 325 that is supplied to the data input (D) will be passed to the output Q of the flip-flip 450 when the CPU idle status signal 335 supplied to the clock input CLK becomes high.

In an exemplary operation, if the target mode signal 325 indicates that the intended operating mode of the microcontroller 100 is an asynchronous operating mode, the current mode signal will be output by the flip-flop 450 and indicate that the current mode signal corresponds to the asynchronous operating mode when the CPU idle status signal 335 at the clock input CLK of the flip-flop 450 indicates that the CPU 115 has entered a reduced power (e.g., sleep) state.

For example, when the microcontroller is to enter an asynchronous operating mode, the SCU will generate the target mode signal 325 indicating that the microcontroller intends to enter the asynchronous operating mode. The SCU 150 will provide the target mode signal 325 indicating the asynchronous operating mode to the CPU 115 (and/or other components of the microcontroller 100). Upon the CPU 115 entering a sleep state, the SCU 150 will generate the current mode signal 330 based on the target mode signal 325 and the CPU idle status signal 335 that indicates the CPU 115 entering the sleep state. The SCU 150 will provide the generated current mode signal 330 to the CPU 115 (and/or other components of the microcontroller 100). Upon leaving the reduced power (sleep) state (i.e., the CPU 115 returning to an active, normal power mode), the CPU 115 will operate in the asynchronous operating mode. A similar operation is performed when the microcontroller 100 is to operate in the synchronous operating mode, but the target mode signal 325 and the current mode signal 330 will indicate that the microcontroller 100 is to operate in the synchronous operating mode.

Figure 5:
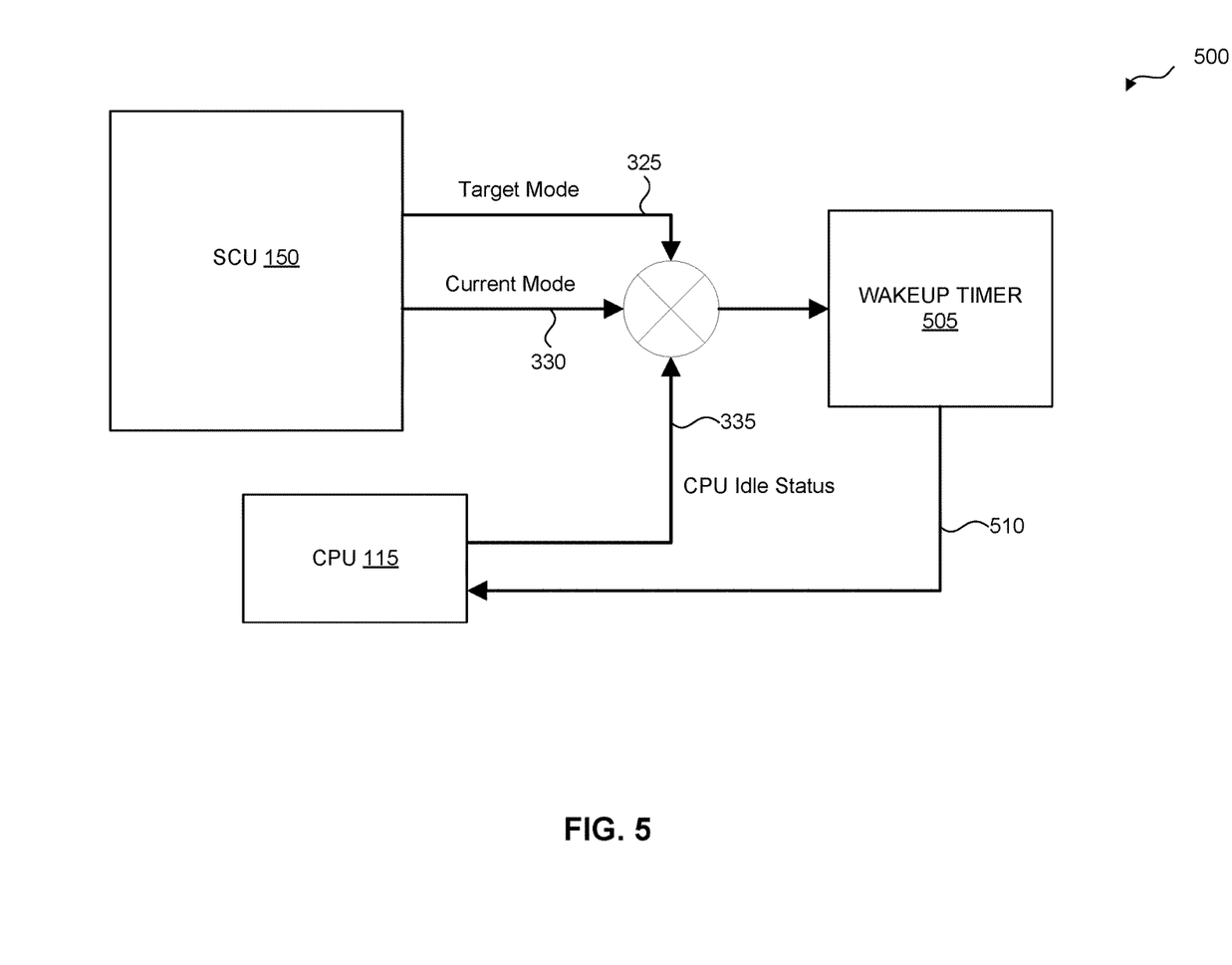
FIG. 5 illustrates a microcontroller according to an exemplary embodiment of the present disclosure.

Turning to FIG. 5, the microcontroller 100 can include a wakeup timer 505 in an exemplary embodiment of the present disclosure. The wakeup timer 505 can be configured to generate a wakeup signal 510. In an exemplary embodiment, the wakeup timer 505 can be configured to generate the wakeup signal 510 based on the target mode signal 325, the current mode signal 330, and the CPU idle status signal 335. In an exemplary embodiment, the wakeup timer 505 can include one or more circuits and/or logic configured to generate the wakeup signal 510. In an exemplary embodiment, the wakeup timer 505 can be a component of the SCU 150 or the CPU 115 and be included therein.

The wakeup signal 510 can be, for example, an interrupt signal, and can be configured to wake the CPU 115 from a reduced power (e.g., sleep) state. In an exemplary embodiment, the wakeup time 505 can generate the wakeup signal 510 when: the target mode signal 325 indicates that the microcontroller 100 intends to operate in the synchronous operating mode, the current mode signal 330 indicates that the microcontroller 100 is currently operating in the asynchronous operating mode, and the CPU idle status signal 335 indicates that the CPU 115 is currently operating in reduced power (sleep) state. In this example, the wakeup timer 505 is configured to force the CPU 115 to wake from a reduced power state and to operate in an active, normal power state if the microcontroller 100 is to transition from the asynchronous operating mode to the synchronous operating mode.

The wakeup timer 505 is not limited to generating the wakeup signal 510 when the microcontroller 100 is transitioning from the asynchronous operating mode to the synchronous operating mode. For example, in an exemplary embodiment, the wakeup timer 505 can be configured to generate the wakeup signal 510 when the microcontroller 100 transitions from the synchronous operating mode to the asynchronous operating mode.

Figure 6:
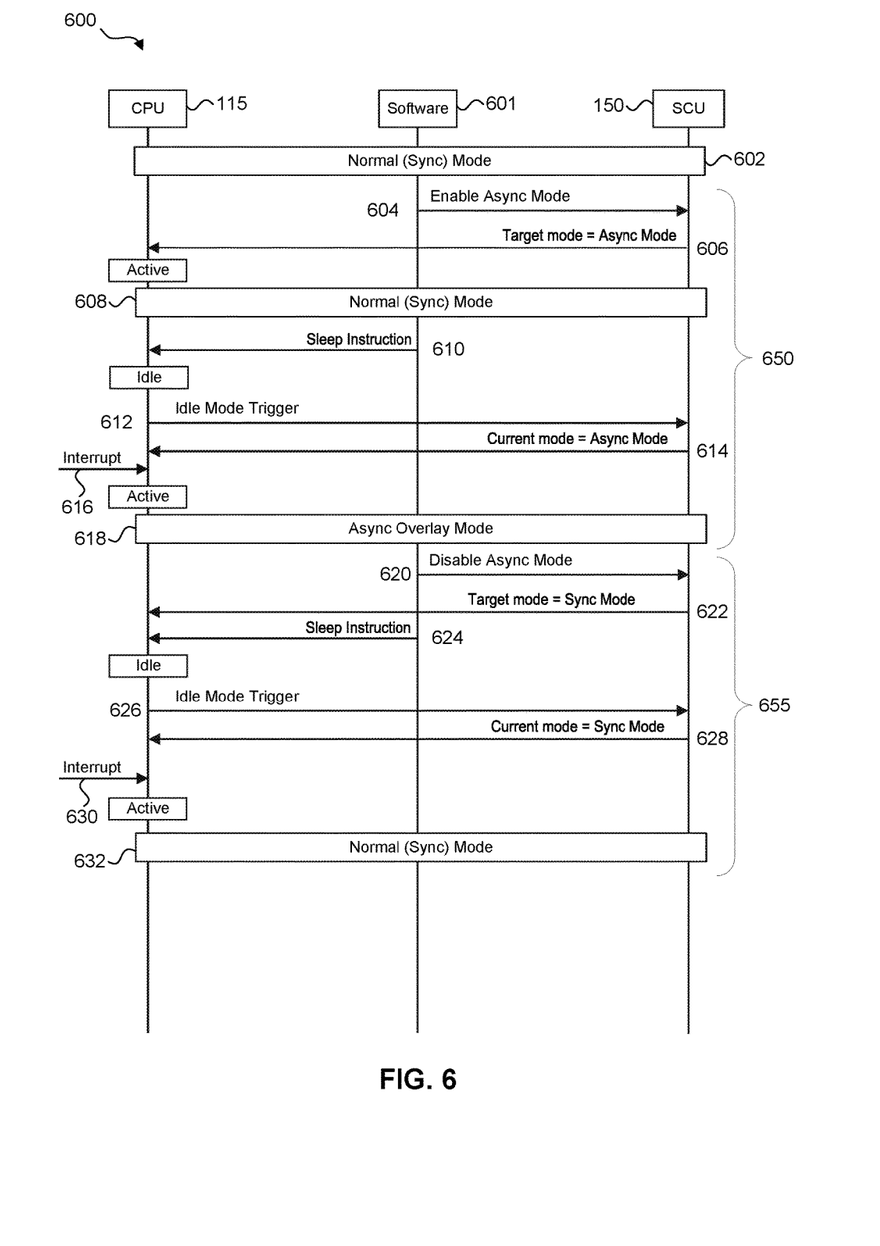
FIG. 6 illustrates a flowchart of a power reduction method according to an exemplary embodiment of the present disclosure.

FIG. 6 illustrates a flowchart 600 of a power reduction method according to an exemplary embodiment of the present disclosure. The flowchart is described with continued reference to FIGS. 1-5. The steps of the method are not limited to the order described below, and the various steps may be performed in a different order. Further, two or more steps of the method may be performed simultaneously with each other.

The method of flowchart 600 begins at step 602, where the microcontroller 100 is operating in the synchronous operating mode. The operations collectively referenced by 650 can be performed to transition from the synchronous to the asynchronous operating mode.

When the microcontroller 100 is to operate in in the asynchronous operating mode (and transition from the synchronous operating mode to the asynchronous operating mode), the flowchart 600 transitions to step 604, where the CPU 115 generates the asynchronous enable/disable signal 320 (programming signal 121) that indicates that the asynchronous mode is to be enabled, and provides the signal 320 to the SCU 150. In an exemplary embodiment, software 601 running on the CPU 115 generates the signal 320.

After step 604, the flowchart 600 transitions to step 606, where the target mode 325 is generated and provided to the CPU 115. The SCU 150 can generate the target mode signal 325 which indicates that the intended operating mode is the asynchronous operating mode. At this point, the CPU 115 can be currently operating in an active, normal powered state. In this example, the CPU 115 is still currently operating in the synchronous operating mode at step 608.

The CPU 115 can enter a reduced power (sleep) state (step 610). In an exemplary embodiment, the software 601 running on the CPU 115 generates a sleep instruction signal and controls the CPU 115 to enter the reduced power (sleep) state. For example, the CPU 115 executes the sleep instruction of the software 601. In response to the sleep instruction signal and the target mode signal 325, the CPU 115 enters the reduced power state (i.e., idle state). In an exemplary embodiment, by execution of the sleep instruction, the CPU 115 can be configured to adjust one or more processes performed by the CPU 115 to transition to a reduced power (sleep) state. The processes can include, for example, allowing the instructions being executed and that are pending execution to complete, inserting no operation commands (NOP) into one or more pipeline latches, adjusting the program counter, and/or gate all data-path clocks.

At step 612, in response to entering the reduced power state, the CPU 115 generates the CPU idle status signal 335 (idle mode trigger) and provides the CPU idle status signal 335 to the SCU 150.

At step 614, the SCU 150 can generate the current mode signal 330 in response to the CPU idle status signal 335. In an exemplary embodiment, the SCU 150 generates the current mode signal 330 based on the target mode signal 325 and the CPU idle status signal 335. In this example, the current mode signal 330 becomes active and has a value indicative of the asynchronous operating mode. The SCU 150 can provide the current mode signal 330 to the CPU 115, as well as one or more peripherals 130, interconnect 120, memory 135, and/or memory 140.

The CPU 115 can then be woken up from the reduced power mode by an interrupt signal (step 616). The interrupt signal can be received from, for example, one or more components of the microcontroller 100 or an external component via the I/O transceiver 155 and bus 160. In response to the interrupt signal, the CPU 115 becomes active and operates in the asynchronous operating mode (step 618).

The operations collectively referenced by 655 can be performed to transition from the asynchronous to the synchronous operating mode.

When the microcontroller 100 is to operate in the synchronous operating mode (and transition from the asynchronous operating mode to the synchronous operating mode), the step 620 is performed, where the CPU 115 generates the asynchronous enable/disable signal 320 (programming signal 121) that indicates that the synchronous mode is to be enabled. The asynchronous enable/disable signal 320 is then provided to the SCU 150. In an exemplary embodiment, software 601 running on the CPU 115 generates the signal 320.

After step 620, the flowchart 600 transitions to step 622, where the target mode 325 is generated and provided to the CPU 115. The SCU 150 can generate the target mode signal 325 which indicates that the intended operating mode is the synchronous operating mode. At this point, the CPU 115 can be currently operating in an active, normal powered state.

The CPU 115 can enter a reduced power (sleep) state (step 624). In an exemplary embodiment, the software 601 running on the CPU 115 generates a sleep instruction signal and controls the CPU 115 to enter the reduced power (sleep) state. For example, the CPU 115 executes the sleep instruction of the software 601. In response to the sleep instruction signal and the target mode signal 325, the CPU 115 enters the reduced power state (i.e., idle state) at step 624. In an exemplary embodiment, by execution of the sleep instruction, the CPU 115 can be configured to adjust one or more processes performed by the CPU 115 to transition to a reduced power (sleep) state. The processes can include, for example, inserting no operation commands (NOP) into one or more pipeline latches.

At step 626, in response to entering the reduced power state, the CPU 115 generates the CPU idle status signal 335 (idle mode trigger) and provides the CPU idle status signal 335 to the SCU 150.

At step 628, the SCU 150 can generate the current mode signal 330 in response to the CPU idle status signal 335. In an exemplary embodiment, the SCU 150 generates the current mode signal 330 based on the target mode signal 325 and the CPU idle status signal 335. In this example, the current mode signal 330 becomes active and has a value indicative of the synchronous operating mode. The SCU 150 can provide the current mode signal 330 to the CPU 115.

The CPU 115 can then be woken up from the reduced power mode by an interrupt signal (step 6630). The interrupt signal can be received from, for example, one or more components of the microcontroller 100 or an external component via the I/O transceiver 155 and bus 160. In an exemplary embodiment, the interrupt signal can be generated by the wakeup time 505 as the wakeup signal 510.

In response to the interrupt signal, the CPU 115 because active and enters the normal power mode, and operates in the synchronous operating mode (step 632).

CONCLUSION

The aforementioned description of the specific embodiments will so fully reveal the general nature of the disclosure that others can, by applying knowledge within the skill of the art, readily modify and/or adapt for various applications such specific embodiments, without undue experimentation, and without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

References in the specification to "one embodiment," "an embodiment," "an exemplary embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The exemplary embodiments described herein are provided for illustrative purposes, and are not limiting. Other exemplary embodiments are possible, and modifications may be made to the exemplary embodiments. Therefore, the specification is not meant to limit the disclosure. Rather, the scope of the disclosure is defined only in accordance with the following claims and their equivalents.

Embodiments may be implemented in hardware (e.g., circuits), firmware, software, or any combination thereof. Embodiments may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact results from computing devices, processors, controllers, or other devices executing the firmware, software, routines, instructions, etc. Further, any of the implementation variations may be carried out by a general purpose computer.

For the purposes of this discussion, the term "processor circuitry" shall be understood to be circuit(s), processor(s), logic, or a combination thereof. For example, a circuit can include an analog circuit, a digital circuit, state machine logic, other structural electronic hardware, or a combination thereof. A processor can include a microprocessor, a digital signal processor (DSP), or other hardware processor. The processor can be "hard-coded" with instructions to perform corresponding function(s) according to embodiments described herein. Alternatively, the processor can access an internal and/or external memory to retrieve instructions stored in the memory, which when executed by the processor, perform the corresponding function(s) associated with the processor, and/or one or more functions and/or operations related to the operation of a component having the processor included therein.

In one or more of the exemplary embodiments described herein, processor circuitry can include memory that stores data and/or instructions. The memory can be any well-known volatile and/or non-volatile memory, including, for example, read-only memory (ROM), random access memory (RAM), flash memory, a magnetic storage media, an optical disc, erasable programmable read only memory (EPROM), and programmable read only memory (PROM). The memory can be non-removable, removable, or a combination of both.

What is claimed is:

1. A microcontroller, comprising:
a processor configured to:
operate synchronously in a synchronous operating mode and asynchronously in an asynchronous operating mode; and
generate a processor idle status signal indicative of the processor operating in a reduced power mode, and generate a programming signal; and
a system controller configured to:
generate an asynchronous mode signal based on the programming signal and the processor idle status signal, the asynchronous mode signal including:
a target mode signal corresponding to an upcoming operation mode of the processor, the target mode generated based on the programming signal; and
a current mode signal to instruct the processor to begin operating in the upcoming operation mode, the current mode signal being generated based on the target mode signal and the processor idle status signal; and
provide the asynchronous mode signal to the processor to control the processor to selectively operate in the synchronous operating mode and in the asynchronous operating mode.

2. The microcontroller of claim 1, wherein the upcoming operation mode of the processor is the synchronous operating mode or the asynchronous operating mode.

3. The microcontroller of claim 1, wherein the system controller is configured to:
generate the target mode signal based on the programming signal; and
generate the current mode signal based on the programming signal and the processor idle status signal.

4. The microcontroller of claim 3, wherein the system controller is configured to generate the current mode signal if the processor idle status signal indicates that the processor is operating in the reduced power mode.

5. The microcontroller of claim 1, wherein the system controller comprises:
a register configured to generate the target mode signal based on the programming signal; and
a memory configured to generate the current mode signal based on the target mode signal and the processor idle status signal.

6. The microcontroller of claim 5, wherein the memory comprises a flip flop.

7. The microcontroller of claim 6, wherein:
a data input of the flip flop receives the target mode signal,
a clock input of the flip flop receives the processor idle status signal, and
a non-inverted output of the flip flop outputs the current mode signal.

8. The microcontroller of claim 1, wherein the microcontroller further comprises one or more peripheral devices, wherein the system controller is further configured to provide the asynchronous mode signal to the one or more peripheral devices to control the one or more peripheral devices to operate in the asynchronous operating mode.

9. The microcontroller of claim 8, wherein the processor is configured to operate fully asynchronously in the asynchronous operating mode and the one or more peripheral devices is configured to operate at least partially asynchronously in the asynchronous operating mode.

10. The microcontroller of claim 1, wherein, when operating in the synchronous operating mode, the processor operates based on a clock signal, and when operating in the asynchronous operating mode, the processor operates independent of the clock signal.

11. A microcontroller, comprising:
a processor configured to:
operate synchronously in a synchronous operating mode and asynchronously in an asynchronous operating mode; and
generate a processor idle status signal indicative of the processor operating in a reduced power mode, and generate a programming signal; and
a system controller including:
a register configured to generate a target mode signal based on the programming signal, the target mode signal corresponding to an upcoming operation mode of the processor; and a memory configured to generate a current mode signal based on the target mode signal and the processor idle status signal, the current mode signal indicating that the processor is to begin operating in the upcoming operation mode, wherein the system controller is configured to provide the target mode signal and the current mode signal to the processor to control the processor to selectively operate in the synchronous operating mode and in the asynchronous operating mode.

12. The microcontroller of claim 11, wherein the upcoming operation mode of the processor is the synchronous operating mode or the asynchronous operating mode.

13. The microcontroller of claim 11, wherein the memory is configured to generate the current mode signal if the processor idle status signal indicates that the processor is operating in the reduced power mode.

14. The microcontroller of claim 11, wherein the memory comprises a flip flop.

15. The microcontroller of claim 14, wherein:
a data input of the flip flop receives the target mode signal,
a clock input of the flip flop receives the processor idle status signal, and
a non-inverted output of the flip flop outputs the current mode signal.

16. The microcontroller of claim 11, wherein the microcontroller further comprises one or more peripheral devices, wherein the system controller is further configured to provide the asynchronous mode signal to the one or more peripheral devices to control the one or more peripheral devices to operate in the asynchronous operating mode.

17. The microcontroller of claim 16, wherein the processor is configured to operate fully asynchronously in the asynchronous operating mode and the one or more peripheral devices is configured to operate at least partially asynchronously in the asynchronous operating mode.

18. The microcontroller of claim 11, wherein, when operating in the synchronous operating mode, the processor operates based on a clock signal, and when operating in the asynchronous operating mode, the processor operates independent of the clock signal.

19. The microcontroller of claim 11, further comprising a wakeup timer configured to control the processor to exit the reduced power mode when:
the processor is operating in the asynchronous operating mode, and
the upcoming operation mode of the processor is the synchronous operating mode.

20. The microcontroller of claim 11, wherein the processor is configured to adjust one or more operations of the processor when entering the reduced power mode based on the target mode signal.

21. The microcontroller of claim 1, wherein:
a value of the asynchronous mode signal is set to a current value of the programming signal, and
the generation of the asynchronous mode signal is controlled based on a value of the processor idle status signal.

22. The microcontroller of claim 1, wherein the programming signal is a bus transaction.

23. The microcontroller of claim 1, wherein the system controller is configured to:
determine, based on the programming signal and the processor idle status signal, which one of the synchronous operating mode and the asynchronous operating mode the processor is to operate in; and
generate the asynchronous mode signal based on the determination.

* * * * *